United States Patent [19]

Cowett, Jr.

[11] 4,186,434

[45] Jan. 29, 1980

[54] MEANS FOR PRODUCING AND CONTROLLING DEAD-TIME OF THE SWITCHING TRANSISTORS DC-TO-DC AND DC-TO-AC CONVERTERS

[75] Inventor: Philip M. Cowett, Jr., Olney, Md.

[73] Assignee: The United States of America as represented by the Secretary of the Army, Washington, D.C.

[21] Appl. No.: 889,455

[22] Filed: Mar. 23, 1978

[51] Int. Cl.² .......................................... H02M 3/335
[52] U.S. Cl. ....................................... 363/24; 363/97; 363/134
[58] Field of Search .................... 363/24–26, 363/56, 97, 133, 134

[56] References Cited

U.S. PATENT DOCUMENTS

| | | | |
|---|---|---|---|
| 3,351,840 | 11/1967 | Yearley | 363/24 |
| 3,417,311 | 12/1968 | Logan | 363/133 X |
| 3,506,908 | 4/1970 | Resch | 363/133 |
| 3,670,234 | 6/1972 | Joyce | 363/56 |

FOREIGN PATENT DOCUMENTS 1262000 4/1961 France .................................. 363/133
1204682 9/1970 United Kingdom .................. 363/56

Primary Examiner—William M. Shoop
Attorney, Agent, or Firm—Nathan Edelberg; Robert P. Gibson; Saul Elbaum

[57] ABSTRACT

A driver circuit is provided for producing and controlling the dead-time of switching transistors in DC-to-DC or DC-to-AC converter circuits to prevent cross conduction and/or to control the output voltage as a function of that dead-time. Driver transistors are switched alternately ON and OFF and drive the switching transistors through a capacitor-shunted transformer primary having a charging current applied to a center tap thereon to predictably control the gradual application to and removal of base drive from the switching transistors, thereby predictably controlling the dead-time of the switching transistors and in some applications, the output voltage of the converter circuit also. The charging current may be either manually or automatically varied to vary the dead-time as desired.

5 Claims, 1 Drawing Figure

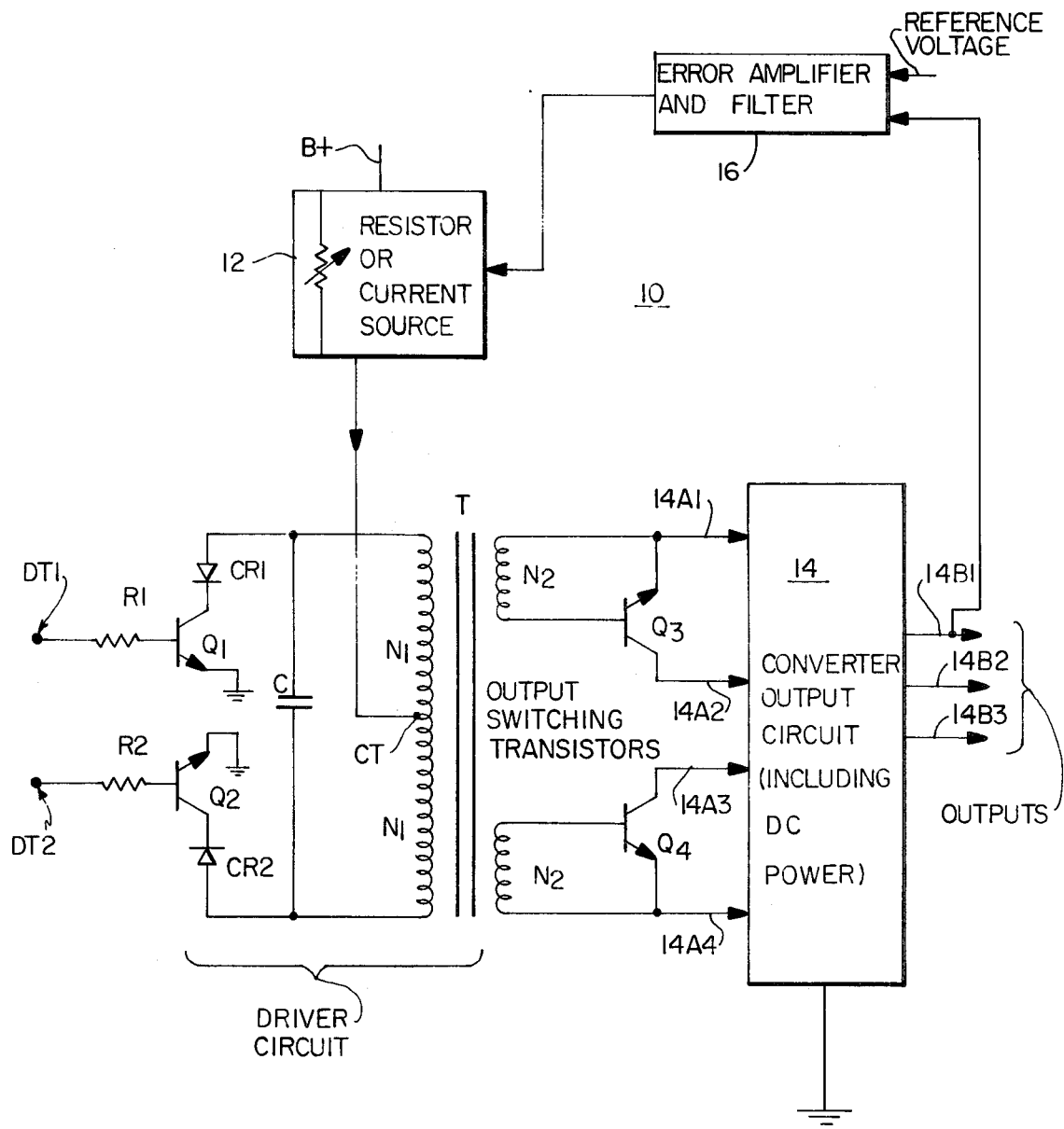

MEANS FOR PRODUCING AND CONTROLLING DEAD-TIME OF THE SWITCHING TRANSISTORS DC-TO-DC AND DC-TO-AC CONVERTERS

FIELD OF THE INVENTION

This invention relates to DC-to-DC converter circuits and more particularly, to the regulation of the dead-time of such circuits.

BACKGROUND OF THE INVENTION

In DC-to-DC converter circuits which utilize switching transistors, a means is required for controlling the simultaneous off-times of such switching transistors, both to prevent cross-current conduction in the switching transistors of the converter and/or to allow for output regulation or adjustment in such circuits.

It is an object of the present invention to provide a DC-to-DC converter circuit in which the driver circuit is so constructed as to prevent cross-conduction between a pair of switching transistors.

Still another object of the present invention is to provide a new and novel switching-regulated DC-to-DC converter circuit in which a novel driver circuit is provided having the capability of affecting the regulation and/or adjustment of the output voltage of such converter.

These and other objects of the present invention will become more fully apparent with reference to the following specification and drawing which relate to a preferred embodiment of the invention.

BRIEF DESCRIPTION OF THE DRAWING

The drawing is a schematic block diagram of a DC-to-DC converter circuit of the present invention in which the driver circuit and the switching transistor means are illustrated in more detailed schematic form.

SUMMARY OF THE INVENTION

The DC-to-DC switching-regulated converter of the present invention comprises a driver circuit means in which first and second switching transistors having their emitters grounded, are connected at their bases to sources of square wave driving pulses alternately applied thereto such that one is on when the other is off and vice versa, are connected to opposite sides of an input transformer primary through the cathode to anode paths of first and second diodes and in which the input transformer primary is shunted by a capacitance connected across the two anode terminals of the said diodes.

First and second switching transistors controlling a converter output circuit of a type well-known in the art for DC-to-DC or DC-to-AC converters are individually driven by secondary transformer coils to thereby control the converter output circuit in a manner well-known to those of ordinary skill in the art.

The presence of the capacitor across the primary of the input transformer prevents voltage across the primary of the transformer from changing instantaneously.

The transformer is further provided with a current source connected from a suitable source of bias to a center tap on the transformer primary. Current from that source gradually discharges the capacitance and recharges it in the opposite direction causing the voltage at the junction of the transformer primary and one of the diodes in the driver circuit to jump from zero to a predetermined value when the driving transistor not associated directly with the said one diode first turns on and then to gradually change from that said one voltage level to a like voltage level of opposite polarity. This action, through the transformer, gradually removes the base drive from one of the converter switching transistors and gradually applies a base drive voltage to the other of the said switching transistors. This gradual removal of base voltage results in a much more abrupt removal of base drive current, due to the basic characteristics of base-emitter (diodes) junctions. Hence, a substantial dead-time is developed when there is insufficient voltage at the base of either of the switching transistors for either of them to be turned on.

Now, if the converter output circuit includes an average detecting rectifier in its makeup, or if no rectifier is used and a purely RMS AC output is desired, then variation in the dead-time will change the output voltage of the converter circuit. Thus, by varying the current source driving the center tap of the input transformer primary or by varying the shunt capacitor across the input transformer primary, a variation in the output voltage of the converter circuit can be achieved. Furthermore, the current from this current source can be varied automatically by a feedback loop, providing output voltage regulation.

DETAILED DESCRIPTION OF THE DRAWING

Referring in detail to the drawing, the input stage of the converter circuit 10 generally illustrated in the drawing is shown as including first and second driving terminals DT1 and DT2 which are connected, respectively, through the first and second resistors R1 and R2 to the base terminals of first and second driver transistors Q1 and Q2, the latter being driven such that one is off when the other is on and vice versa by the application of appropriate square wave driving pulses to the said driving terminals DT1 and DT2.

The emitter terminals of both of the driver transistors Q1 and Q2 are grounded as indicated.

The collector terminals of the driver transistors Q1 and Q2 are respectively connected to the cathode terminals of first and second diodes CR1 and CR2 respectively, the latter having the anode sides thereof connected to opposite ends of the primary winding of a transformer T having similar primary coils N1 connected on opposite sides of a center tap CT to the respective anodes of the said first and second diodes CR1 and CR2.

The center tap CT of the primary winding of the transformer T is connected to one side of a resistor or current source 12 which is connected at its other side to a source bias B+ as shown.

The secondary of the driver circuit or input transformer T comprises two similar secondary windings N2 each of which is connected across a respective base to emitter path of first and second switching transistors Q3 and Q4. The emitters and collectors of the switching transistors Q3 and Q4 are connected to respective input terminals 14A1, 14A2, 14A3 and 14A4 of a converter output circuit module 14 which includes a DC power source from which the desired conversion is to be effected and which also includes a plurality of output terminals 14B1, 14B2 and 14B3 all as is conventionally known in the art.

The driver input circuit of the present invention is completed by shunting the primary of the transformer T with a capacitance C which accordingly, is also connected across both anode terminals of the said first and second diodes CR1 and CR2. The capacitor can alternatively, be connected across any portion of any winding on the transformer. Its proper value will depend on transformer turns ratios.

OPERATION OF THE INVENTION

Referring further to the drawing, it has already been described that these driver transistors Q1 and Q2 are switched on and off by the application of suitable square wave driving signals, in a manner well-known in the art, to the driver terminals DT1 and DT2 such that Q1 is on when Q2 is off and vice versa. Both of these driver transistors Q1 and Q2 are on exactly one-half of the time (a 50 percent duty cycle).

Assuming for the purpose of operation that the first driving transistor Q1 is on and all transients therein have died down, then the interaction through the transformer T and the secondary winding N2 provide that the first switching transistor Q3 is on and that the first diode CR1 is conducting into the collector of the first driver transistor Q1 and the voltage at the center tap CT of the transformer T is defined by $(N1/N2)V_{BE}$, where $V_{BE}$ is the base-emitter voltage of the first switching transistor Q3 and N1 and N2 define the number of turns in the respective portions of the primary and secondary windings of the transformer T.

The capacitor C is thus charged to twice this value.

If we now define a voltage $V_P=(N1/N2)V_{BE}$, then C is charged to a voltage of $2V_P$ and the voltage at the collector of the second driver transistor Q2 becomes $2V_P$, neglecting any drops occurring across the first and second diodes CR1 and CR2.

Then, when the second driver transistor Q2 turns on and the first driver transistor Q1 turns off, the second driver transistor Q2 and the second diode CR2 conduct, causing the voltage at the collector of the second driver transistor Q2 to drop from a value of $+2V_P$ to zero. The capacitor C then prevents the voltage across the primary winding of the transformer T from changing instantaneously. Furthermore, current from the resistor or current source 12 gradually discharges the capacitor C and recharges it in the opposite direction, causing the voltage at the junction of the first diode CR1 and the primary of the transistor T to jump from zero to $-2V_P$ when the second driver transistor Q2 first turns on, and then to gradually change from a value of $-2V_P$ to $+2V_P$, a fourfold swing in the voltage $V_P$.

This action gradually removes base drive from the first switching transistor Q3 and gradually applies it to the second switching transistor Q4 on the input side of the converter output circuit 14.

This gradual removal of base voltage from one switching transistor and gradual application to the other results in a much more abrupt removal of base drive current, due to the basic characteristics of base-emitter (diode) junctions. Hence, a substantial dead-time is developed when there is insufficient voltage at the base of either of the switching transistors Q3 or Q4 for either of them to be turned on.

Further assuming that the converter output circuit 14 utilizes average or RMS detecting rectifiers to drive its output terminals, or if the output terminals are driven to achieve an RMS AC output, then changing the dead-time between the first and second switching transistors Q3 and Q4 will cause a proportionate and controllable variation in the output voltage at the terminals 14B1-14B3.

Accordingly, output voltage adjustment is achievable by varying the value of the resistor or current output from the resistor or current source 12, or by varying the value of the capacitor C in the driver circuit of the converter 10 of the present invention.

Additionally, in another preferred embodiment of the present invention, an error amplifier and filter circuit 16 can be interconnected between the converter output circuit 14 and the resistor or current source 12 such that it functions to compare the output voltage achieved in the converter output circuit 14 to a reference voltage desired and the error amplifier and filter 16 then controls the resistor or current source 12 in a manner well-known to those of ordinary skill in the art to vary the parameters of the latter and thereby achieve a variation in the dead-time between the first and second switching transistors Q3 and Q4 that will correct the discrepancy between the desired voltage and the voltage achieved to thereby regulate the output voltage of the converter output circuit 14.

Therefore, it can be seen that the driver circuit of the present invention provides a simple and readily adjustable means for varying the dead-time between the first and second switching transistors of a DC-to-AC or DC-to-DC converter circuit of the type utilizing average or RMS type detecting rectifiers or RMS AC voltage output for the purpose of controlling the output voltage thereof. This control of the output voltage can be utilized in a regulation mode by means of a feedback loop which compares the actual output voltage to a reference and varies the current output from a resistor or current source biasing the center tap of the primary of the input transformer from the driver circuit to the switching transistors to thereby control the dead-time between the said switching transistors and the resultant output voltage of the converter circuit.

It should be understood that the converter circuit of the present invention may be modified as would occur to one of ordinary skill in the art without departing from the spirit and scope of the present invention.

It is claimed:

1. In DC-to-DC and DC-to-AC converter circuits including first and second switching transistor means the improvement comprising:

driver circuit means for controlling the dead-time between said first and second switching transistor means, comprising:

a source of driver input pulses providing a source of external current;

first and second driver transistor means having base, emitter and collector terminals and being responsive to said input pulses applied to said bases such that the first is ON when the second is OFF and vice versa each of said driver transistors having a 50% duty cycle;

first and second diode means conducting into the collectors of said first and second transistor means;

a driver transformer having a primary winding with a center tap and having its respective ends connected through said diodes to said collectors;

a capacitor in shunt with said primary winding; and a current source supplying said center tap with a charging current for said capacitor, said driver transformer having secondary windings driving first and second switching transistors in correlation with said driver transistors;

said charging current being selectively variable to control the dead-time between said first and second switching transistors; and said driver circuit means controlling said dead-time between said first and second switching transistor means by ensuring that said shunt capacitor is charged solely by said current from said current source means.

2. The invention defined in claim 1, wherein said current source comprises a source of bias and a variable resistor means in series with said center tap.

3. The invention defined in claim 1, wherein said driver circuit means further includes a feedback circuit resonsive to said output voltage providing an error signal representing variations of said output voltage from a reference value; and wherein said current source is responsive to said error signal to change said charging current being supplied to said center tap to control said dead-time as a function of said error signal, and thus achieve output voltage regulation.

4. The invention defined in claim 1, 2, or 3, wherein said first and second diode means prevent said shunt capacitor from being charged by said external current from said driver input pulses thereby ensuring control of said dead-time between said first and second switching transistors solely by the amount of said current being supplied from said current source means through said center tap and said primary winding of said driver transformer to said shunt capacitor.

5. The invention defined in claims 1, 2, or 3, wherein said control of said dead-time between said first and second switching transistors is further accomplished by variably charging said shunt capacitor solely by said charging current, said charging current being selectively and variably supplied to said shunt capacitor through said primary winding of said driver transformer via said center tap of said driver transformer from said current source means.

* * * * *